UNITED STATES PATENT OFFICE.

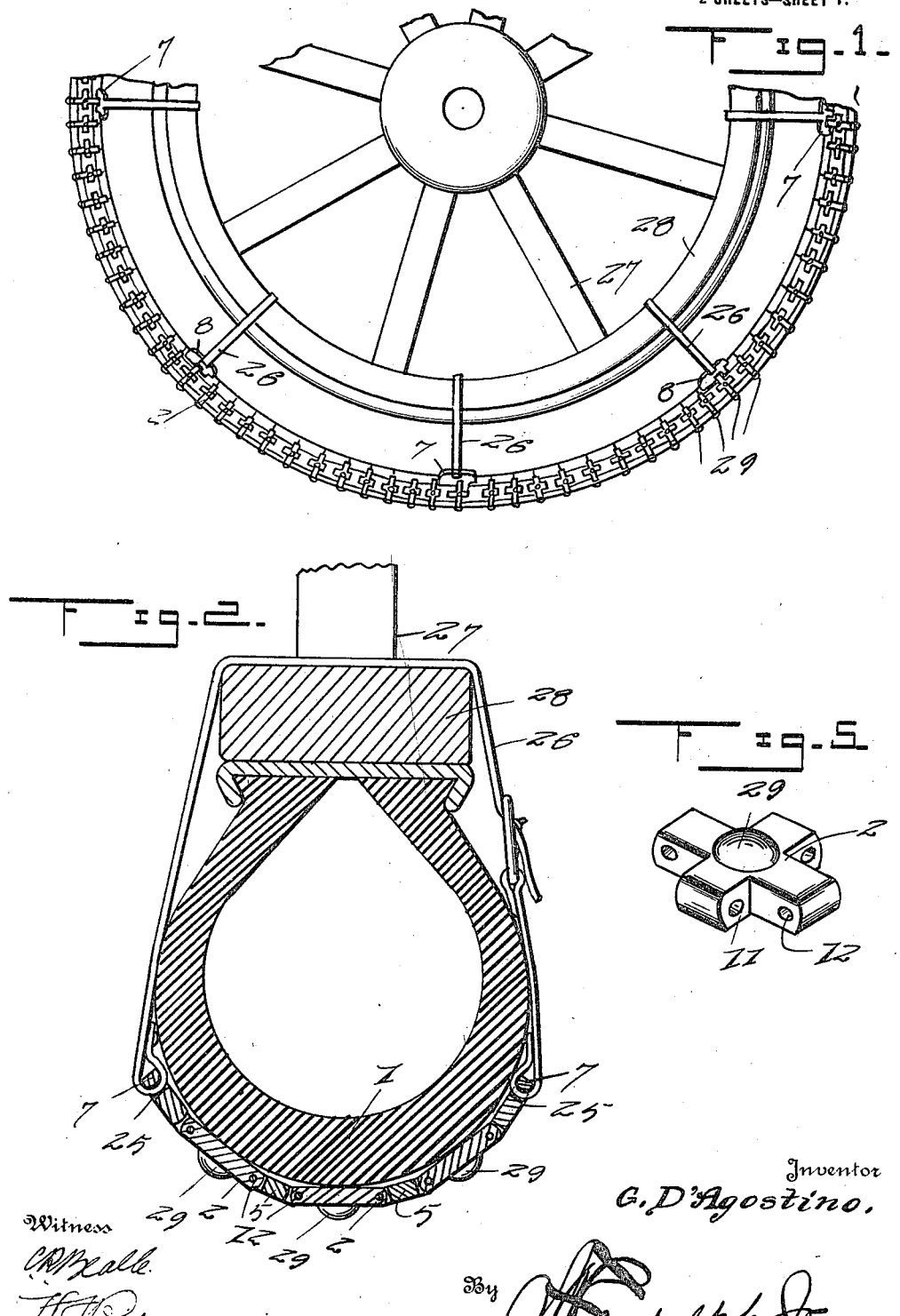

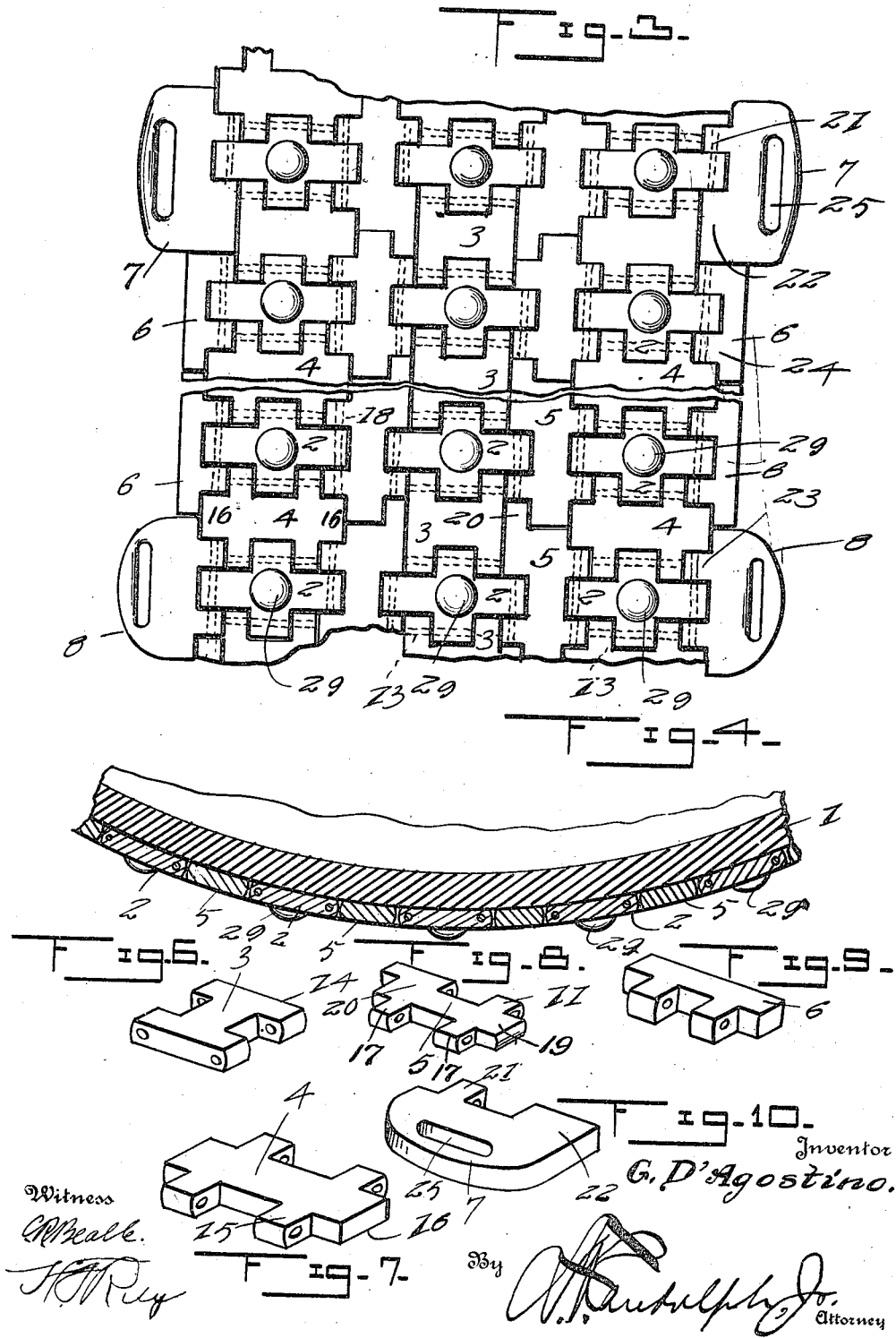

GIUSEPPE D'AGOSTINO, OF ROME, NEW YORK.

TIRE-PROTECTOR.

1,318,268.  Specification of Letters Patent.  Patented Oct. 7, 1919.

Application filed April 24, 1917. Serial No. 164,186.

*To all whom it may concern:*

Be it known that I, GIUSEPPE D'AGOSTINO, a citizen of the United States, residing at Rome, in the county of Oneida and State of New York, have invented certain new and useful Improvements in Tire-Protectors; and I do hereby declare the following to be a full, clear, and exact description of the invention, such as will enable others skilled in the art to which it appertains to make and use the same.

The invention relates to improvements in tire protectors.

The object of the present invention is to improve the construction of tire protectors and to provide a simple, practical and efficient tire protector of strong, durable and inexpensive construction adapted to be readily applied to pneumatic tires of automobiles and various other motor vehicles, and adapted to effectually prevent puncturing of the same or wear thereof through contact with a roadway.

With these and other objects in view, the invention consists in the construction and novel combination of parts hereinafter fully described, illustrated in the accompanying drawings and pointed out in the claim hereto appended; it being understood that various changes in the form, proportion, size and minor details of construction, within the scope of the claim, may be resorted to without departing from the spirit or sacrificing any of the advantages of the invention.

In the drawings:

Figure 1 is a fragmentary side elevation of a tire protector constructed in accordance with this invention and shown applied to a pneumatic tire.

Fig. 2 is a transverse sectional view of the same.

Fig. 3 is an enlarged plan view of a portion of the tire protector.

Fig. 4 is an enlarged sectional view of the same and a portion of the tire.

Fig. 5 is a detail perspective view of one of the stud carrying anti-skid links.

Figs. 6 and 7 are detail views of the longitudinal connecting links.

Fig. 8 is a detail view of one of the transverse connecting links.

Fig. 9 is a detail view of one of the side links.

Fig. 10 is a detail view of one of the attaching plates.

Like numerals of reference designate corresponding parts in the several figures of the drawings.

In the accompanying drawings, in which is illustrated the preferred embodiment of the invention, the tire protector consists of a circumferentially arranged armor extending around the wheel and being of sufficient width to extend across the tread portion of the outer tube or shoe 1 of a pneumatic tire so as to effectually prevent the latter from coming in contact with the roadway. The armor, which is flexible to enable it to yield with the pneumatic tire in order that the latter may operate unhampered in its cushioning action, is constructed of suitable metal and is composed of stud-carrying substantially cruciform anti-skid links 2, longitudinal connecting links 3 and 4, transverse connecting links 5, side links 6 and attaching plates 7 and 8. The anti-skid links 2 are provided with side and end bearing lugs 11 and 12, the end bearing lugs being of slightly greater length than the side bearing lugs and the links are disposed transversely of the armor. The side lugs receive transversely disposed pivots or pintles 13, which connect the anti-skid links with the longitudinal connecting links. The longitudinal connecting links 3 and 4 are provided with side lugs 14 and 15 which are arranged in pairs and which are provided with alining openings for the reception of the transverse pivots or pintles for connecting them to the anti-skid links. The longitudinal connecting links 4 are also provided with end studs 16 which are imperforate and fit the adjacent terminal portions of the transversely disposed links. The transversely disposed links 5 are provided at opposite sides with bearing lugs 17 which receive longitudinal pivots 18 for hinging the transverse links 5 to the end lugs of the anti-skid links 2. The transversely disposed links have terminal lugs 19 and some of the transverse links are provided with longitudinally enlarged or elongated laterally projecting portions 20 forming continuations of the adjacent end lugs.

The armor is provided at opposite sides with the attaching plates 7 and 8, which are provided with bearing lugs 21, 22 and 23, which are spaced apart to receive longitudinal pivots or pintles for connecting the adjacent end lugs 12 with the attaching plates.

The side links 6, which are provided at their inner sides with lugs 24, are hinged by longitudinal pintles to the anti-skid links and are located between the attaching plates. The attaching plates 7 and 8 are provided with slots or openings 25 which receive straps 26 arranged at intervals and adapted to extend through the wheel 27 and engage the felly 28 thereof. Any other suitable attaching means may of course be employed for securing the armor in position and the longitudinal and transverse pintles will permit the flexibly connected links to yield to the cushioning action of the tire. The studs 29 of the anti-skid links are shown rounded to provide convex protuberances, and they may be constructed of any suitable material and can also be of various formations to secure the necessary engagement between the armor and the surface of the roadway.

What is claimed is:

A tire armor including a plurality of cruciform links arranged circumferentially of a tire and having side and end lugs, transverse links disposed between the transverse edges of the cruciform links and having oppositely arranged pairs of lugs, the lugs of each pair being arranged on opposite sides of the lugs of the cruciform links and pivotally connected thereto, longitudinal connecting lugs disposed between the longitudinal edges of the cruciform links and provided with pairs of oppositely arranged lugs, the lugs of each pair of lugs of the longitudinal connecting links being arranged on opposite sides of the end lugs of the cruciform links and pivotally connected thereto, the ends of the transverse links being provided with contacting terminal lugs and means to attach the armor to a tire.

In testimony whereof I affix my signature in presence of two witnesses.

GIUSEPPE D'AGOSTINO.

Witnesses:
MICHAEL LUGATTA,
DOMINICO CONDARATO.

Copies of this patent may be obtained for five cents each, by addressing the "Commissioner of Patents, Washington, D. C."